UNITED STATES PATENT OFFICE.

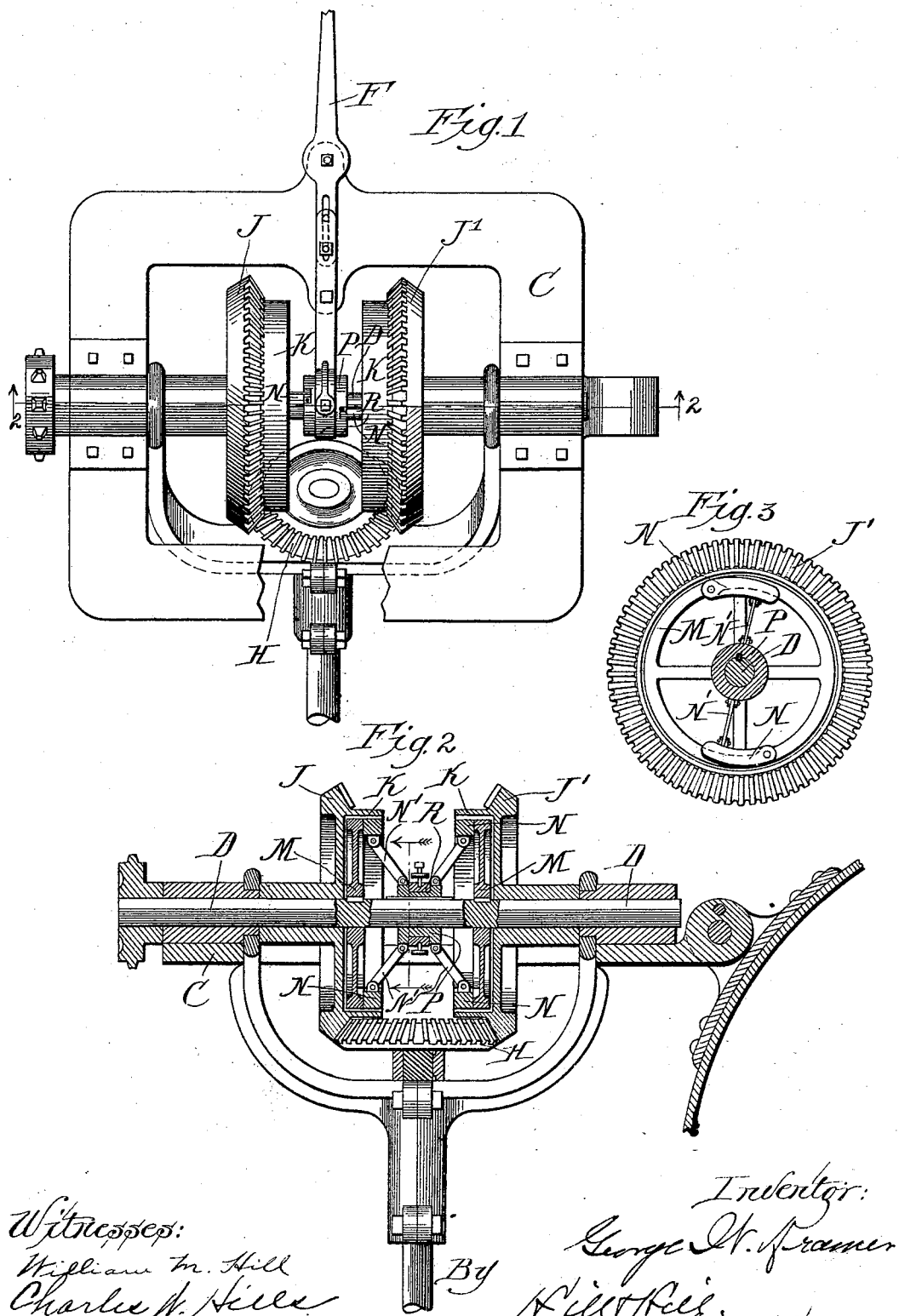

GEORGE W. KRAMER, OF PEORIA, ILLINOIS, ASSIGNOR TO THE HART WEIGHER COMPANY, OF SAME PLACE.

STEERING-GEAR FOR TRACTION-ENGINES.

SPECIFICATION forming part of Letters Patent No. 520,688, dated May 29, 1894.

Application filed July 24, 1893. Serial No. 481,329. (No model.)

*To all whom it may concern:*

Be it known that I, GEORGE W. KRAMER, a citizen of the United States, residing at Peoria, county of Peoria, and State of Illinois, have invented certain new and useful Improvements in Steering-Gears for Traction-Engines, of which the following is a specification.

Referring to the accompanying drawings, wherein like reference letters indicate like or corresponding parts,—Figure 1, is a plan view of my improved machine. Fig. 2, is a sectional view in line 2—2 of Fig. 1, and Fig. 3, is a view of the gear J', with the clutch device in position.

This invention is in the nature of an improvement upon the invention shown, described and claimed, in my application for Letters Patent filed April 7, 1892, Serial No. 428,242, which application was allowed July 7, 1893, and from which application this invention was withdrawn by amendment of April 21, 1893. It has in view the same objects set forth in the application above named, and consists, broadly, in actuating either one or the other of the oppositely disposed beveled gears, by means of what is known as a "rim clutch," that is to say, by means of a clutch in which one or more parts engage with a rim or part upon the gear to be driven, and by such engagement operate the device and direct the engine in the desired course.

In the preferred form shown in the drawings, the frame C is secured to the boiler of the engine, and a shaft D, driven by the power of the engine, is supported by the frame. Two oppositely disposed beveled gears J J', having a rim part adapted to engage with a clutch, are loosely mounted upon the shaft. An intermediate beveled gear H meshes with both of said gears and is driven to the right or to the left according to which one of said gears operates it. The rotation of the gear H is communicated to the take-up drum in any satisfactory manner, and the front wheels of the engine are thus turned to the right or to the left to steer it in the desired course. Near each of the gears J J' is a pulley or wheel M, mounted upon and revolving with the shaft D. Upon or near the periphery of the pulleys M are pivotally connected shoes or parts N adapted to be brought into frictional contact with the rims K to operate the gear of which said rim is a part. Mounted upon the shaft D between the gears J J' is a collar P, adapted to revolve with the shaft and to be moved longitudinally upon the same by means of the encircling collar R and the shifting lever F. From the outer ends of the part P arms N' extend to the shoes N in such a manner that upon moving the part P toward either of the gear wheels J J' the shoe or shoes N at that end are caused to come into frictional contact with the rim K and operate the same, and through the several parts guide the engine as desired.

There are many kinds of clutches known which are adapted for such engagement all working more or less satisfactorily and I do not, therefore, broadly claim the clutching device by itself. It is obvious that various ways can be devised in which the clutch may engage the rim, for example, the said rim may be "pinched" between two approaching parts or jaws; or the contact may be formed outside the rim, instead of inside the same, as shown. It does not matter in what way such contact is made so long as the desired gear wheel J or J' is caused to rotate as set forth. Therefore, while I illustrate my invention with one form, I do not wish to be understood as limiting myself to that single form, as my invention consists essentially in a friction clutch device of the general class described, when used in combination with the working parts of a traction engine, and for the particular purpose specified, namely, the guiding or steering of the engine when upon the road.

Having thus described my invention, what I claim as new, and desire to secure by Letters Patent, is—

1. In a steering gear for traction engines, a frame supported by the boiler; a shaft journaled on the frame and driven by the power of the engine; two oppositely disposed beveled gears loosely mounted on the shaft, and having rims adapted to engage a clutch; an intermediate gear meshing with both the other gears, and adapted to be driven by either of the same; and means for communicating the rotary motion of the intermediate gear to the take-up drum; in combination with two clutches mounted upon and revolving with the shaft, and so arranged that each of said clutches shall engage with the rim of a gear to operate the same, and each being so connected to the shifting lever that only one of said gears will be operated at a time, whereby upon moving the shifting lever one way one of the gears is operated and the engine is directed on one course, and upon moving the shifting lever the other way, the other gear is operated and the engine is directed on an opposite course; substantially as and for the purposes set forth.

2. In a device of the kind described, the frame C; the shaft D carried thereby; the gears J J' loosely mounted on the shaft, and having rims K formed thereon; the intermediate gear H meshing with both the other gears and adapted to be driven by either; and means for communicating the rotary motion of the gear H to the take-up drum; in combination with the pulleys M M mounted upon the shaft near the gears J J' and adapted to rotate with said shaft; and shoes N pivotally connected to said pulleys and adapted to be brought into frictional contact with the rims K to operate one or the other of the gears J J', whereby the engine is directed upon a desired course.

3. In a device of the kind described, the frame C; the shaft D carried thereby; the gears J J' loosely mounted on the shaft and having rims K formed thereon; the intermediate gear H meshing with both the other gears and adapted to be driven by either; and means for communicating the rotary motion of the gear H to the take-up drum; in combination with the pulleys M M mounted upon the shaft near the gears J J' and adapted to rotate with the shaft; shoes N pivotally connected with said pulleys; the collar P mounted upon the shaft between the gears J J' and adapted to be longitudinally moved upon the same; the collar R encircling the collar P and connected to the shifting lever; and arms N'' extending from the collar P to the shoes N, whereby upon longitudinally moving the part P one way or the other the shoes N are caused to engage with the rim K upon one end or the other, and the engine thereby directed as desired; substantially as and for the purposes set forth.

GEO. W. KRAMER.

Witnesses:
D. S. LEE,
C. M. SALZENSTEIN.